United States Patent
Morikawa

(10) Patent No.: US 7,573,694 B2
(45) Date of Patent: Aug. 11, 2009

(54) APPARATUS FOR AND METHOD OF CONTROLLING OPERATION OF SOLENOID-OPERATED VALVE

(75) Inventor: Fumio Morikawa, Misato (JP)

(73) Assignee: SMC Kabushiki Kaisha, Tokyo (JP)

(*) Notice: Subject to any disclaimer, the term of this patent is extended or adjusted under 35 U.S.C. 154(b) by 282 days.

(21) Appl. No.: 11/432,558

(22) Filed: May 12, 2006

(65) Prior Publication Data

US 2006/0254653 A1    Nov. 16, 2006

(30) Foreign Application Priority Data

May 13, 2005    (JP) .............................. 2005-141346

(51) Int. Cl.
*H01H 47/00* (2006.01)
(52) U.S. Cl. ..................................... 361/160
(58) Field of Classification Search .................. 361/160
See application file for complete search history.

(56) References Cited

U.S. PATENT DOCUMENTS

| | | | |
|---|---|---|---|
| 5,647,387 A * | 7/1997 | Tsutsui | ........................... 137/1 |
| 6,164,323 A | 12/2000 | Smith et al. | |
| 6,493,204 B1 * | 12/2002 | Glidden et al. | .............. 361/187 |
| 2004/0145851 A1 | 7/2004 | Otto et al. | |
| 2005/0151103 A1 | 7/2005 | Kubota et al. | |

FOREIGN PATENT DOCUMENTS

| | | |
|---|---|---|
| CN | 1543544 | 11/2004 |
| DE | 195 22 582 | 12/1996 |
| DE | 196 41 188 | 1/1998 |
| DE | 103 02 988 | 10/2004 |
| DE | 10 2004 056 653 | 6/2006 |
| JP | 3-213782 | 9/1991 |
| JP | 5-47334 | 12/1993 |
| JP | 2002-005424 | 1/2002 |
| JP | 2002-098255 | 4/2002 |

* cited by examiner

*Primary Examiner*—Stephen W Jackson
(74) *Attorney, Agent, or Firm*—Paul A. Guss

(57) ABSTRACT

A control circuit turns a transistor on and off in order to energize a drive coil of a solenoid-operated valve in a rated voltage mode at a duty ratio of 100% during a predetermined first period, which is sufficiently long to move a movable element in the drive coil, from the time when an operation command signal starts being applied to the solenoid-operated valve. The control circuit further repeatedly energizes the drive coil in a power-saving mode at a duty ratio smaller than the duty ratio in the rated-voltage mode, during a predetermined second period following the rated-voltage mode. The drive coil is energized alternately in the rated-voltage mode and in the power-saving mode, until application of the operation command signal to the solenoid-operated valve is terminated.

9 Claims, 6 Drawing Sheets

APPARATUS FOR AND METHOD OF CONTROLLING OPERATION OF SOLENOID-OPERATED VALVE

BACKGROUND OF THE INVENTION

1. Field of the Invention

The present invention relates to an apparatus and method for controlling operation of a solenoid-operated valve, and more particularly to an apparatus and method for controlling operation of a solenoid-operated valve, which is actuated in a rated mode and a power-saving mode.

2. Description of the Related Art

Solenoid-operated valves are actuated by general-purpose output devices, such as a sequencer or the like. Generally, a large amount of electric power is required to move a movable element in a drive coil of a solenoid-operated valve in order to actuate the solenoid-operated valve, and after the movable element has moved, the movable element is held in position with a relatively small amount of electric power.

Based on such characteristics, there has been proposed a power-saving mode for controlling operation of solenoid-operated valves.

According to a first example of the power-saving mode, a rated voltage is applied to the drive coil of the solenoid-operated valve for a predetermined period of time based on a solenoid-operated valve drive command signal. During a remaining period of time of the solenoid-operated valve drive command signal, a holding voltage, which is lower than the rated voltage, is applied to the drive coil of the solenoid-operated valve following application of the rated voltage, for thereby actuating the solenoid-operated valve in the power-saving mode (see, for example, Japanese Laid-Open Patent Publication No. 3-213782).

According to a second example of the power-saving mode, a drive coil of a solenoid-operated valve is energized at a duty ratio of 100% for a predetermined period of time based on a solenoid-operated valve drive command signal under the control of a microprocessor, for moving a movable element in the drive coil. During a remaining period of time of the solenoid-operated valve drive command signal, following energization at a duty ratio of 100%, the drive coil is energized at a lower duty ratio in the power-saving mode in order to hold the movable element in the drive coil (see, for example, U.S. Pat. No. 6,164,323).

However, while the solenoid-operated valve is energized in the power-saving mode, the movable element is held under a weak force. When the solenoid-operated valve is subjected to a strong external shock or the like in the power-saving mode, the movable element tends to be displaced from the held position, causing the solenoid-operated valve to switch from one fluid passage to another fluid passage. At this time, a cylinder that has been actuated by a fluid flowing through the solenoid-operated valve may possibly operate unexpectedly.

To avoid the above drawback, the movable element of the solenoid-operated valve may be monitored by a sensor or the like. However, when the solenoid-operated valve is combined with such a sensor, the apparatus becomes relatively complex in structure and is costly to manufacture.

SUMMARY OF THE INVENTION

It is an object of the present invention to provide an apparatus and method for controlling operation of a solenoid-operated valve to hold a movable element thereof reliably in position, and also to keep the movable element held in position even when the solenoid-operated valve is subjected to a strong external shock while the solenoid-operated valve is in operation.

An apparatus for controlling operation of a solenoid-operated valve according to a first aspect of the present invention is combined with the solenoid-operated valve for energizing a drive coil of the solenoid-operated valve at a rated voltage and at a duty ratio of 100% in a rated-voltage mode during a predetermined first period, which is sufficiently long to move a movable element in the drive coil from the time when an operation command signal starts being applied to the solenoid-operated valve. In addition, the drive coil is repeatedly energized in a power-saving mode at a duty ratio smaller than the duty ratio in the rated-voltage mode, during a predetermined second period following the rated-voltage mode, wherein the drive coil is energized alternately in the rated-voltage mode and the power-saving mode, until application of the operation command signal to the solenoid-operated valve is terminated.

With the apparatus, according to the first aspect of the invention, from the time when the operation command signal starts being applied to the solenoid-operated valve, a sufficient amount of electric power for moving the movable element is supplied for a sufficient period. In the rated-voltage mode, the movable element is moved, and in the power-saving mode following the rated-voltage mode, the movable element is held in position. Then, the rated-voltage mode and the power-saving mode are alternately repeated until application of the operation command signal to the solenoid-operated valve is terminated. Therefore, the movable element remains held in position during the entire period, even if an external shock is applied to the solenoid-operated valve.

In the first aspect of the invention, the sum of the first period and the second period should preferably be shorter than a period required for a fluid pressure device connected to the solenoid-operated valve to start changing fluid passages in response to switching movement of the movable element of the solenoid-operated valve.

Even if an external shock is applied to the solenoid-operated valve during the second period, the drive coil is energized in the rated-voltage mode before the fluid pressure device changes fluid passages, thereby preventing the fluid pressure device from changing fluid passages unexpectedly.

In the first aspect of the invention, the apparatus may have a switching device and a control circuit. The switching device may be turned on when the operation command signal starts being applied to the solenoid-operated valve. The control circuit may control an on-period of the switching device based on the rated-voltage mode in the first period and the power-saving mode in the second period, during a period from the time when the operation command signal starts being applied to the solenoid-operated valve until the time when the operation command signal ends being applied to the solenoid-operated valve. The drive coil may be energized during the on-period of the switching device.

Alternatively, in the first aspect of the invention, the apparatus may have a switching device and a control circuit. The switching device may be turned on when the operation command signal starts being applied to the solenoid-operated valve. The control circuit may control an off-period of the switching device based on the rated-voltage mode in the first period and the power-saving mode in the second period, during a period from the time when the operation command signal starts being applied to the solenoid-operated valve until the time when the operation command signal ends being applied to the solenoid-operated valve. The drive coil may be energized during an on-period of the switching device.

An apparatus for controlling a drive coil of a solenoid-operated valve according to a second aspect of the present invention includes a switching device for selectively energizing the drive coil during an operation period, and a control circuit for controlling the switching device. The control circuit comprises a rated-voltage-mode energizing means for controlling the switching device to energize the drive coil under a rated voltage at a duty ratio of 100% in a rated-voltage mode during a predetermined first period, a power-saving-mode energizing means for controlling the switching device to repeatedly energize the drive coil at a duty ratio smaller than the duty ratio in the rated-voltage mode during a predetermined second period following elapse of the predetermined first period, and a repeating means for controlling the rated-voltage-mode energizing means and the power-saving-mode energizing means to energize the drive coil alternately in the rated-voltage mode and the power-saving mode during the operation period.

With the apparatus according to the second aspect of the invention, from the time when the operation command signal starts being applied to the solenoid-operated valve, a sufficient amount of electric power for moving the movable element is supplied for a sufficient period. In the rated-voltage mode, the movable element is moved, while in the power-saving mode following the rated-voltage mode, the movable element is held in position. Then, the rated-voltage mode and the power-saving mode are alternately repeated until application of the operation command signal to the solenoid-operated valve is terminated. Therefore, the movable element remains held in position during the entire period even if an external shock is applied to the solenoid-operated valve.

In the second aspect of the invention, the switching device may be turned on when the operation period begins. The control circuit may control an on-period of the switching device based on the rated-voltage mode in the first period and the power-saving mode in the second period during the operation period. Further, the drive coil may be energized during the on-period of the switching device.

Alternatively, in the second aspect of the invention, the switching device may be turned on when the operation period begins. The control circuit may control an off-period of the switching device based on the rated-voltage mode in the first period and the power-saving mode in the second period during the operation period. Further, the drive coil may be energized during an on-period of the switching device.

According to a third aspect of the present invention, there is also provided a method of controlling operation of a solenoid-operated valve by controlling a switching device for selectively energizing a drive coil of the solenoid-operated valve during an operation period. The method comprises the steps of controlling the switching device to energize the drive coil at a rated voltage and at a duty ratio of 100% in a rated-voltage mode during a predetermined first period, controlling the switching device to repeatedly energize the drive coil at a duty ratio smaller than the duty ratio in the rated-voltage mode during a predetermined second period following the elapse of the first period, and controlling the switching device to energize the drive coil alternately in the rated-voltage mode and the power-saving mode during the operation period.

With the method according to the third aspect of the invention, from the time when the operation command signal starts being applied to the solenoid-operated valve, a sufficient amount of electric power is supplied for a sufficient period for moving the movable element. In the rated-voltage mode the movable element is moved, and in the power-saving mode following the rated-voltage mode the movable element is held in position. Then, the rated-voltage mode and the power-saving mode are alternately repeated until application of the operation command signal to the solenoid-operated valve is terminated. Therefore, the movable element remains held in position during the entire period even if an external shock is applied to the solenoid-operated valve.

According to the first through third aspects of the invention, the movable element of the solenoid-operated valve is reliably held in position and remains held in position even if an external shock is applied to the solenoid-operated valve while the solenoid-operated valve is in operation.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
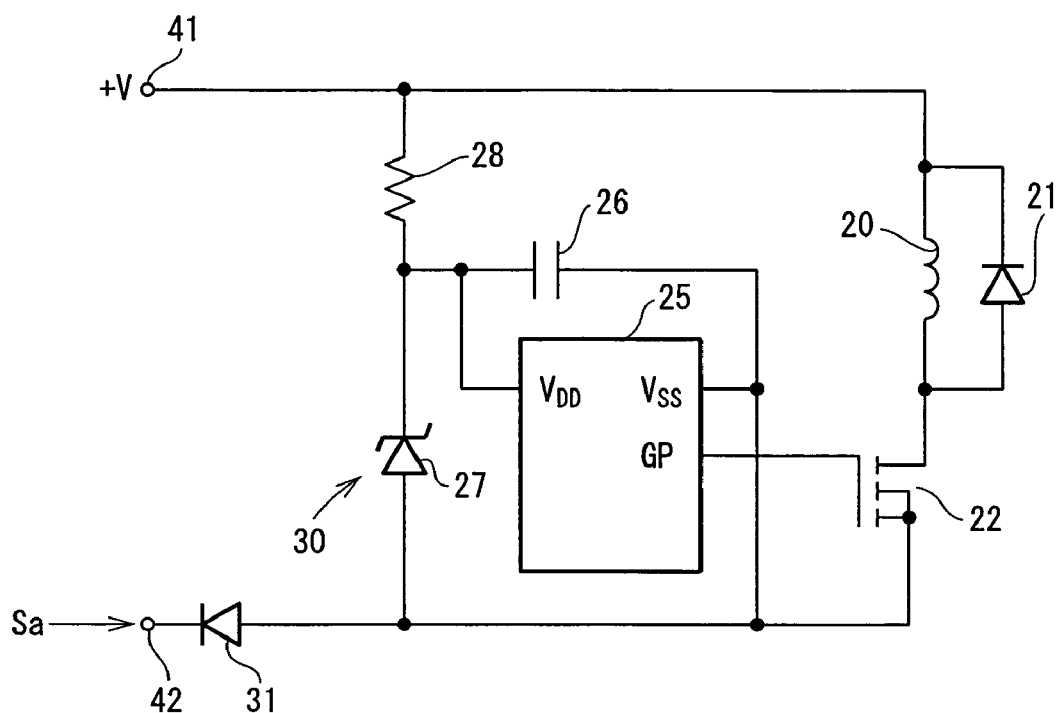
FIG. 1 is a circuit diagram of an operation controlling apparatus according to a first embodiment of the present invention.

Like or corresponding parts are denoted by like or corresponding reference characters throughout the views.

An apparatus and method for controlling operation of a solenoid-operated valve according to preferred embodiments of the present invention shall be described below with reference to FIGS. 1 through 6. The apparatus for controlling operation of the solenoid-operated valve shall be referred to as an operation controlling apparatus.

Figure 4:
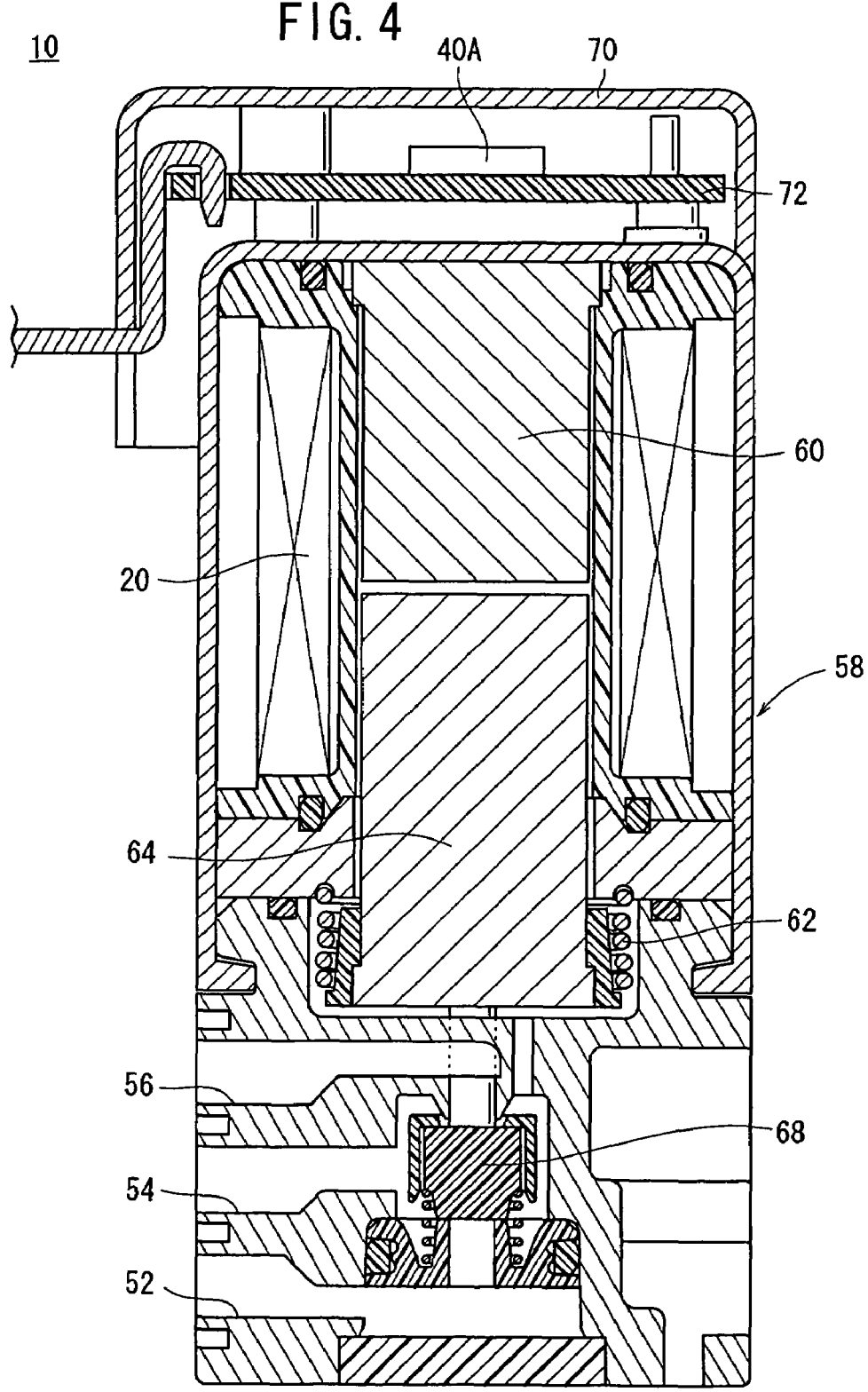
FIG. 4 is a longitudinal cross-sectional view of a solenoid-operated valve, which incorporates the operation controlling apparatus according to the first embodiment.

FIG. 1 is a circuit diagram of an operation controlling apparatus according to a first embodiment. The operation controlling apparatus according to the first embodiment shall be referred to as a "first operation controlling apparatus 40A". FIG. 4 is a longitudinal cross-sectional view of a solenoid-operated valve 10, which incorporates the first operation controlling apparatus 40A mounted on a board 72.

As shown in FIG. 4, the solenoid-operated valve 10 includes a valve body 58 having a pressure fluid supply port 52, a pressure fluid discharge port 54, and an exhaust port 56 defined therein. The valve body 58 houses therein a fixed iron core 60, a movable element 64 normally urged to move away from the fixed iron core 60 under the resiliency of a spring 62, a drive coil 20 surrounding the fixed iron core 60 and the movable element 64, and a valve head 68, which can be unseated from a valve seat when the movable element 64 is attracted to the fixed iron core 60 upon energization of the drive coil 20. The first operation controlling apparatus 40A is mounted on a board 72 disposed between the valve body 58 and a cap 70 mounted on an end of the valve body 58.

As shown in FIG. 1, the first operation controlling apparatus 40A has a power supply terminal 41 and a control input terminal 42. The power supply terminal 41 is connected to the control input terminal 42 through a series-connected circuit of the drive coil 20 of the solenoid-operated valve 10, a transistor 22 (e.g., an n-channel MOS transistor) for turning on and off the drive coil 20 of the solenoid-operated valve 10, and a reverse-current blocking diode 31. A rated voltage for the drive coil 20 of the solenoid-operated valve 10, e.g., a power supply voltage +V of DC 24 V, is applied to the power supply terminal 41. A low potential, e.g., ground potential, is applied as an operation command signal Sa to the control input terminal 42 during an operation command period Td (see FIG. 3A). A high potential, i.e., a potential equal to or higher than the potential applied to the gate of the transistor 22, is applied to the control input terminal 42 in periods other than the operation command period Td. A surge-absorbing diode 21 is connected across the drive coil 20. The diode 21 serves to discharge energy stored across the drive coil 20 when the drive coil 20 is turned on and off.

The first operation controlling apparatus 40A also has a control circuit 25 comprising a microprocessor. The control circuit 25 has a CPU (not shown) for executing a program to at least turn the transistor 22 on and off. The control circuit 25 includes at least a power supply terminal $V_{DD}$, a control terminal GP, and a ground terminal $V_{SS}$.

The control terminal GP is connected to the gate of the transistor 22, which is turned on or off depending on an output voltage from the control terminal GP. Therefore, the control terminal GP functions as a terminal for turning the transistor 22 on and off, or more particularly, as a terminal for controlling the on-time of the transistor 22.

A constant-voltage circuit 30 comprising a series-connected circuit made up of a resistor 28 and a zener diode 27 is connected between the power supply terminal 41 and the anode of the diode 31. During at least the operation command period Td, the constant-voltage circuit 30 applies an output voltage as a power supply voltage of the control circuit 25 to the power supply terminal $V_{DD}$ of the control circuit 25.

The ground terminal $V_{SS}$ of the control circuit 25 is connected to the anode of the diode 31, and is held at a low potential, e.g., ground potential, during at least the operation command period Td. A capacitor 26 connected between the power supply terminal $V_{DD}$ and the ground terminal $V_{SS}$ serves to stabilize the voltages that are applied to the power supply terminal $V_{DD}$ and the ground terminal $V_{SS}$.

Operation of the first operation controlling apparatus 40A thus constructed shall be described below with reference to the flowchart shown in FIG. 2 and the signal waveform diagrams shown in FIGS. 3A and 3B. It is assumed that, in an initial phase, the potential at the control terminal GP of the control circuit 25 is at a low potential, i.e., a potential low enough so as not to turn on the transistor 22.

As shown in FIGS. 3A and 3B, in one predetermined cycle Ts, the control circuit 25 energizes the drive coil 20 at the rated voltage in a rated-voltage mode during a predetermined first period T1, and energizes the drive coil 20 in a power-saving mode during the remaining second period T2. If the operation command period Td is longer than one cycle Ts, then the control circuit 25 repeats the cycle Ts.

Figure 2:
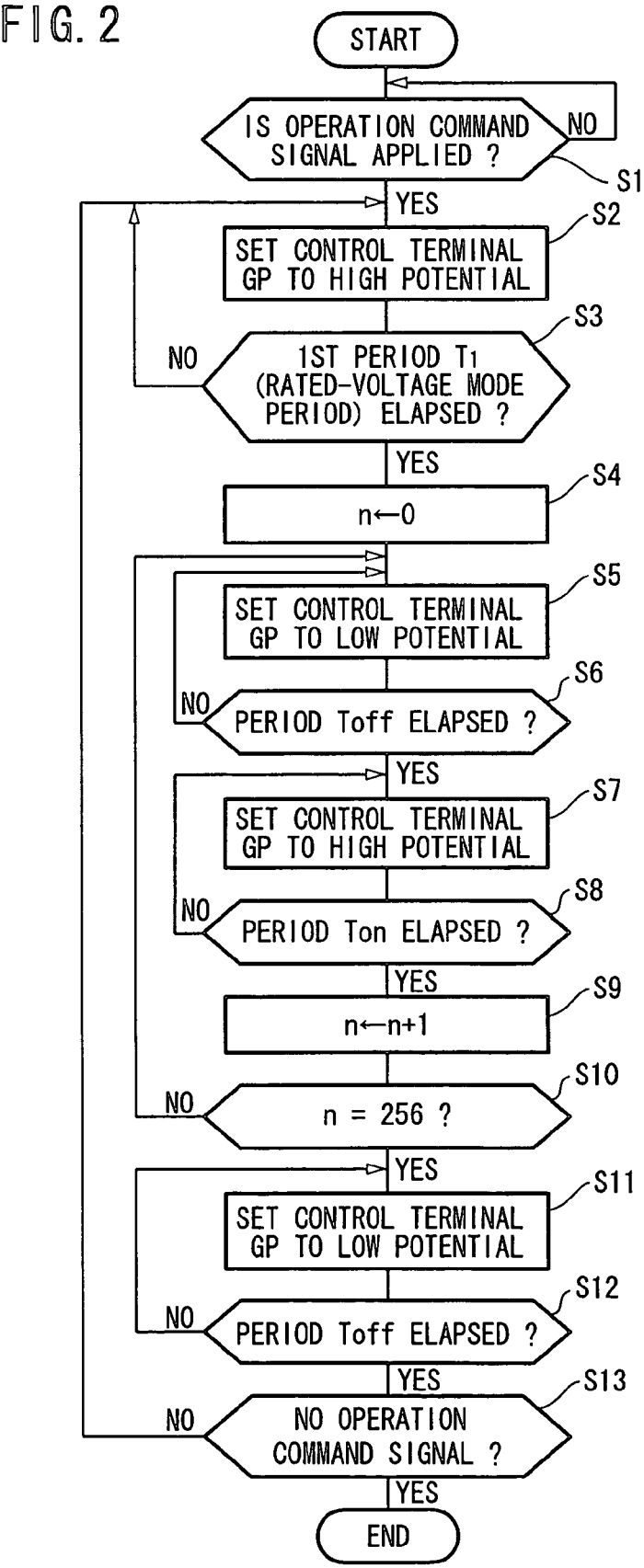
FIG. 2 is a flowchart of a processing sequence of a control circuit of the operation controlling apparatus according to the first embodiment.
Figure 3:
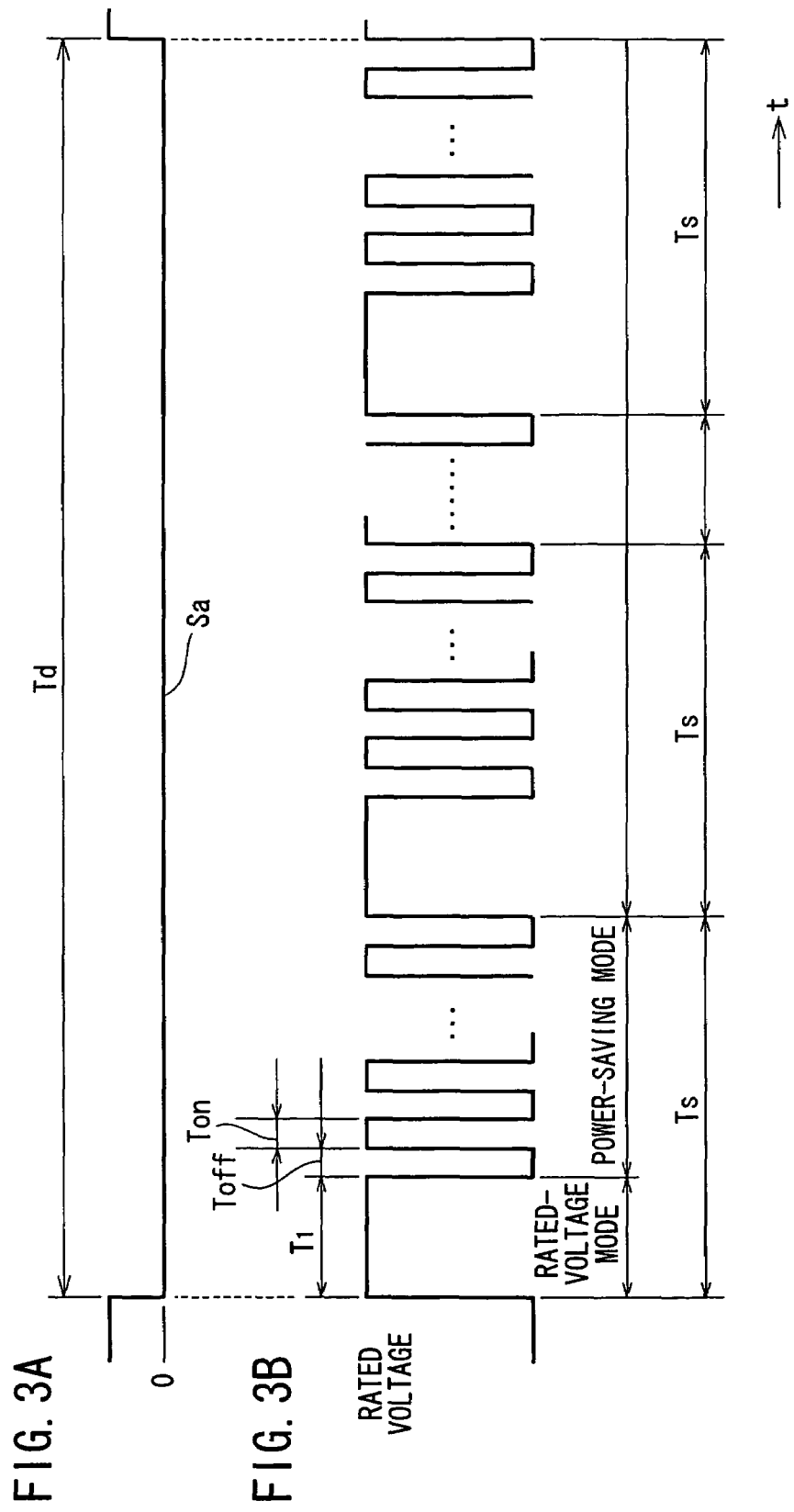
FIG. 3A is a signal waveform diagram showing the relationship between an operation command period and an operation command signal.
FIG. 3B is a signal waveform diagram showing the processing sequence of the control circuit.

In step S1 shown in FIG. 2, the control circuit 25 waits until the potential at the control input terminal 42 becomes a low potential, i.e., until the operation command period Td arrives.

FIG. 3A shows the waveform of the potential at the control input terminal 42. When the potential at the control input terminal 42 becomes a low potential, e.g., ground potential, the operation command period Td begins, and control proceeds to step S2. The signal representing the low potential in the operation command period Td serves as an operation command signal Sa.

In step S2, the control circuit 25 sets the potential at the control terminal GP to a high potential, which is higher than the potential at the control input terminal 42. Since the gate-to-source voltage of the transistor 22 becomes positive, the transistor 22 is turned on, energizing the drive coil 20.

Subsequently, in step S3, the control circuit 25 waits until the predetermined first period T1, e.g., 10 ms, elapses. During the first period T1, the control terminal GP is maintained at the high potential. The first period T1 is measured by counting clock pulses, not shown, supplied to the control circuit 25. Other periods are measured similarly.

During the first period T1, the transistor 22 remains energized to apply the rated voltage to the drive coil 20. Therefore, in the rated-voltage mode, the drive coil 20 is energized at the rated voltage and at a duty ratio of 100%. The first period T1 is set to a period of time long enough for the movable element 64 in the drive coil 20 to be moved by the drive coil 20, which is being energized under the rated voltage in the rated-voltage mode. Consequently, a sufficient amount of electric power for moving the movable element 64 is supplied during the first period T1. During the first period T1, the movable element 64 in the drive coil 20 moves and is attracted to the fixed iron core 60.

If it is judged in step S3 that the first period T1 has elapsed, then a count n, which is indicative of the number of intermittent pulses in a second period T2, is initialized to 0 in step S4. Thereafter, in step S5, the control circuit 25 changes the potential at the control terminal GP from the high potential to a low potential. Then, control proceeds to step S6. During the operation command period Td, the low potential at the control terminal GP is essentially the same as or lower than the potential at the control input terminal 42. The gate-to-source voltage of the transistor 22 now becomes 0 or negative, thereby turning off the transistor 22.

In step S6, the control circuit 25 waits until a predetermined off-period Toff, e.g., 60 µs, elapses. During the off-period Toff, the control terminal GP remains at the low potential.

During the off-period Toff, therefore, the transistor 22 remains deenergized, thus deenergizing the drive coil 20. The electromagnetic energy stored across the drive coil 20 is consumed by the diode 21. The off-period Toff is sufficiently short so that the movable element 64 remains attracted to the fixed iron core 60 or is slightly spaced from the fixed iron core 60.

If it is judged in step S6 that the off-period Toff has elapsed, then the control circuit 25 changes the potential at the control terminal GP from the low potential to the high potential again in step S7. Thereafter, control proceeds to step S8 in which the control circuit 25 waits until a predetermined on-period Ton, e.g., 60 µs, elapses. During the on-period Ton, the control terminal GP remains at the high potential.

During the on-period Ton, therefore, the transistor 22 is energized, energizing the drive coil 20 again. The movable element 64 remains attracted to the fixed iron core 60, or is attracted again to the fixed iron core 60, after it has been slightly spaced or has been about to be spaced from the fixed iron core 60.

If it is judged in step S8 that the on-period Ton has elapsed, then the count n is incremented by +1 in step S9. Thereafter, the control circuit 25 determines whether the count n is a predetermined count N (the number of intermittent pulses in the second period T2), e.g., 256, or not in step S10. The predetermined count N, i.e., the number of intermittent pulses in the second period T2, is selected depending on the specifications of the solenoid-operated valve 10. Preferably, the predetermined count N should be selected based on the operation of a fluid pressure device, such as a cylinder that is connected to the solenoid-operated valve 10. Specifically, the fluid pressure device is a device for changing fluid passages in response to movement of the movable element 64 of the solenoid-operated valve 10. The number of intermittent pulses in the second period T2 should preferably be selected such that the length Ts of one cycle, made up of the first period T1 and the second period T2, is shorter than a period that is required for the fluid pressure device to start changing fluid passages in response to switching movement of the movable element 64 of the solenoid-operated valve 10. With the first operation control apparatus 40A, the pulse period of intermittent pulses in the second period T2 is selected to be about 120 μm, and the number of intermittent pulses in the second period T2 is selected to be 256.

If it is judged in step S10 that the count n is not equal to the predetermined count N, then control returns to step S5 and processing from step S5 is repeated. 256 intermittent pulses are generated in the second period T2 by repeating the processing from step S5.

If it is judged in step S10 that the count n is equal to the predetermined count N, then the control circuit 25 changes the potential at the control terminal GP from the high potential to the low potential again in step S11. Thereafter, in step S12, the control circuit 25 waits until the predetermined off-period Toff, e.g., 60 μs, elapses. During the off-period Toff, the control terminal GP remains at the low potential. When the off-period Toff elapses, the second period T2 is terminated.

If it is judged in step S12 that the off-period Toff has elapsed, then the control circuit 25 determines in step S13 whether the control input terminal 42 is at the high potential or not, i.e., whether the operation command period Td has terminated or not. If it is judged in step S13 that the operation command period Td has not terminated, control returns to step S2 and processing from step S2 is repeated. By repeating the processing from step S2, the cycle Ts including the first period T1 and the second period T2 is repeated until the operation command period Td is terminated. If it is judged in step S13 that the operation command period Td has terminated, then the processing sequence of the control circuit 25 of the operation controlling apparatus 40A is put to an end.

With the operation controlling apparatus 40A, as described above, steps S2 and S3 are executed to energize the drive coil 20 at the rated voltage and at the duty ratio of 100% in the rated-voltage mode, to thereby move the movable element 64 in the drive coil 20 during the first period T1. Following energization of the drive coil 20 at the rated voltage, steps S4 through S10 are executed to energize the drive coil 20 repeatedly 256 times in the power-saving mode at a duty ratio (50% in the above example) which is lower than the duty ratio of 100% in alternate off- and on-periods Toff and Ton, as shown in FIG. 3B, thereby holding the movable element 64 in position within the drive coil 20. Then, steps S2 through S13 are executed to energize the drive coil 20 alternately in the rated-voltage mode and the power-saving mode during the operation command period Td, as shown in FIG. 3B.

Therefore, even when the solenoid-operated valve 10 is subjected to an external shock during the operation command period Td, the movable element 64 remains held in position inside the drive coil 20.

In the above embodiment, the off-period Toff and the on-period Ton are equal to each other. With the off-period Toff and the on-period Ton being equal to each other, the drive coil 20 is energized repeatedly 256 times at a duty ratio of 50% in the power-saving mode. However, the off-period Toff and the on-period Ton need not necessarily be equal to each other.

The sum (cycle Ts) of the first period T1, in which the drive coil 20 is energized in the rated-voltage mode, and the second period T2, in which the drive coil 20 is energized in the power-saving mode, may be set to a period shorter than a period required for the fluid pressure device to start changing fluid passages in response to switching movement of the movable element 64 of the solenoid-operated valve 10. By thus setting the cycle Ts, even if the solenoid-operated valve 10 is subjected to a shock during the second period T2, the drive coil 20 is energized in the rated-voltage mode before the fluid pressure device starts changing fluid passages, so that the fluid pressure device is prevented from operating unexpectedly.

The first period T1, the off-period Toff, and the on-period Ton may be obtained by measuring the machine cycle time of the control circuit 25, rather than by counting clock pulses as described above.

An apparatus for controlling operation of a solenoid-operated valve, i.e., an operation controlling apparatus, according to a second embodiment of the present invention shall be described below with reference to FIGS. 5 and 6. The operation controlling apparatus according to the second embodiment shall be referred to as a "second operation controlling apparatus 40B".

Figure 5:
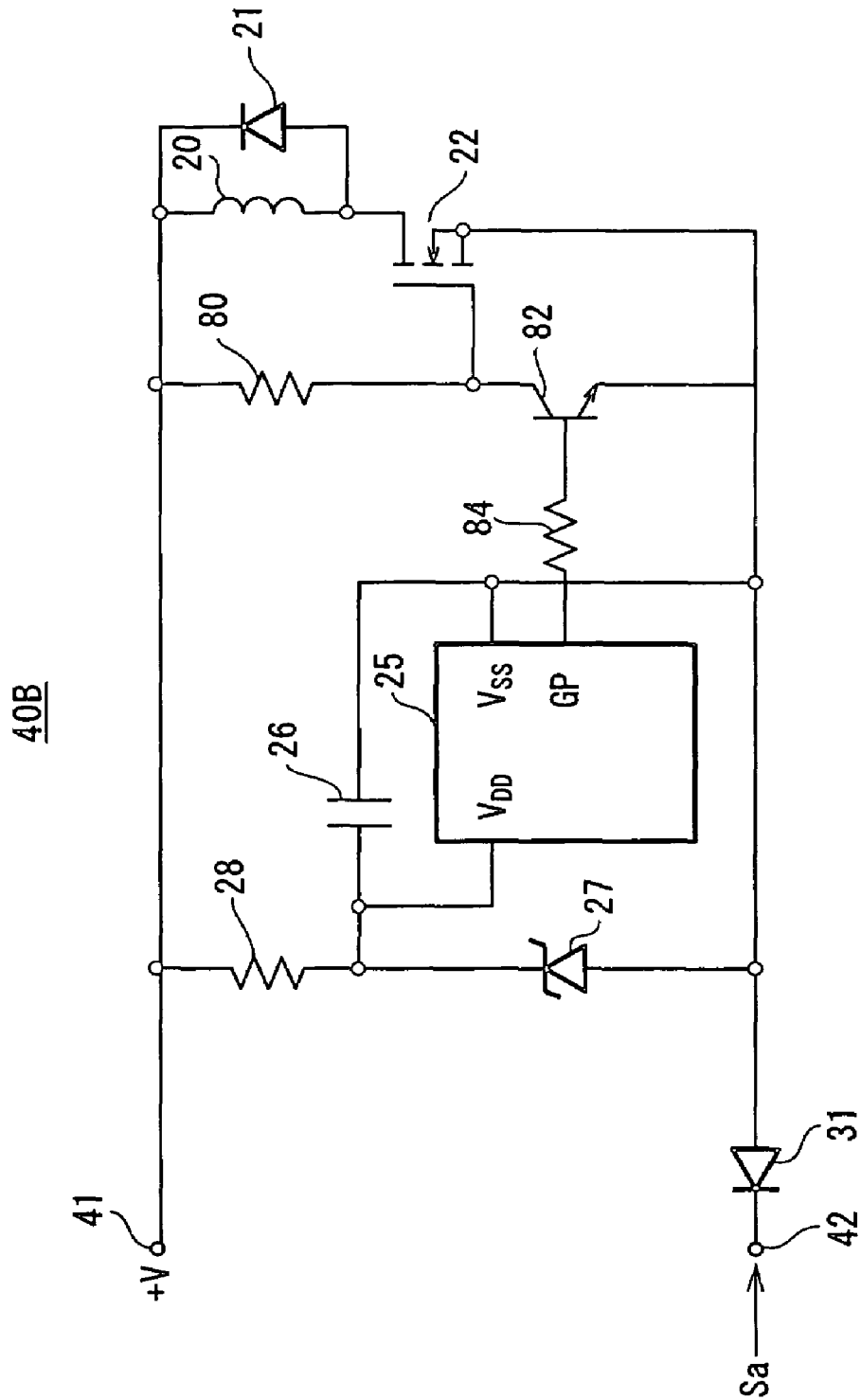
FIG. 5 is a circuit diagram of an operation controlling apparatus according to a second embodiment of the present invention.

As shown in FIG. 5, the second operation controlling apparatus 40B is substantially the same as the first operation controlling apparatus 40A described above, but differs therefrom in that the control terminal GP of the control circuit 25 functions as a terminal for controlling the off-time of the transistor 22.

A series-connected circuit made up of a biasing resistor 80 and a second transistor 82, e.g., an NPN transistor, is connected between the power supply terminal 41 and the anode of the diode 31. The junction between the biasing resistor 80 and the second transistor 82, i.e., the collector of the second transistor 82, is connected to the gate of the transistor 22. The emitter of the second transistor 82 is connected to the anode of the diode 31. The base of the second transistor 82 is connected to the control terminal GP of the control circuit 25 through a resistor 84.

Figure 6:
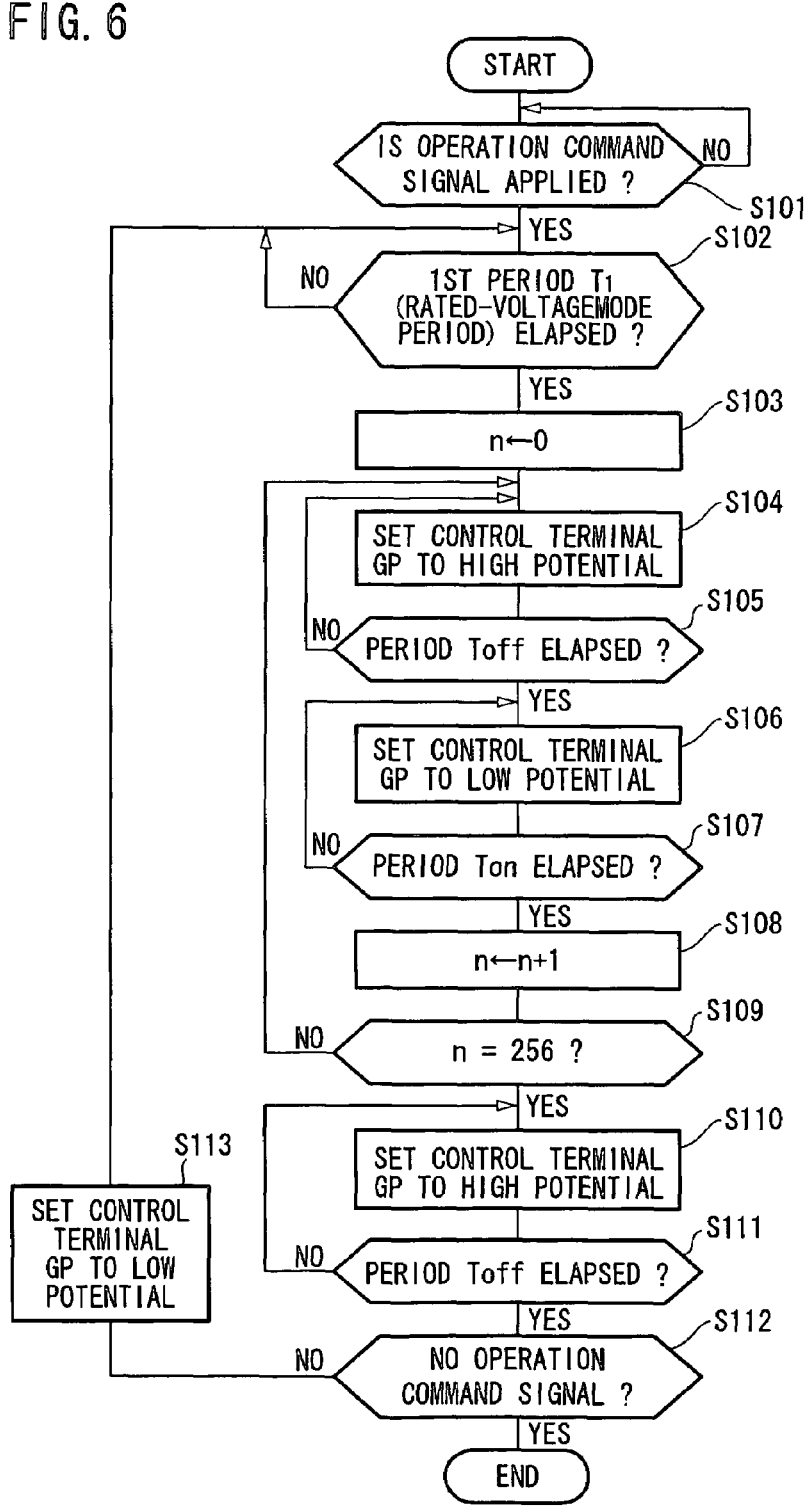
FIG. 6 is a flowchart of a processing sequence of a controller of the operation controlling apparatus according to the second embodiment.

The second operation controlling apparatus 40B operates according to basically the same processing sequence as shown in FIG. 2 (see FIG. 6). The potential at the control terminal GP in the second operation controlling apparatus 40B is a reversal of the potential at the control terminal GP in the first operation controlling apparatus 40A. Specifically, if the potential at the control terminal GP in the first operation controlling apparatus 40A is high, then the potential at the control terminal GP in the second operation controlling apparatus 40B is low, and if the potential at the control terminal GP in the first operation controlling apparatus 40A is low, then the potential at the control terminal GP in the second operation controlling apparatus 40B is high.

Operation of the second operation controlling apparatus 40B shall be described below with reference to the flowchart shown in FIG. 6 and the signal waveform diagrams shown in FIGS. 3A and 3B. It is assumed that, in an initial phase, the potential at the control terminal GP of the control circuit 25 is at a low potential, i.e., a potential low enough so as not to turn on the second transistor 82.

In step S101 shown in FIG. 6, the control circuit 25 waits until the potential at the control input terminal 42 becomes a low potential, i.e., until arrival of the operation command period Td. When the potential at the control input terminal 42 becomes low, the operation command period Td begins, the gate-to-source voltage of the transistor 22 becomes positive, and the transistor 22 is turned on, energizing the drive coil 20.

In step S102, the control circuit 25 waits until the predetermined first period T1 elapses. During the first period T1, the control terminal GP is maintained at the low potential.

During the first period T1, the transistor 22 remains energized so as to apply the rated voltage to the drive coil 20. Therefore, in the rated-voltage mode, the drive coil 20 is energized at the rated voltage and at a duty ratio of 100%.

If it is judged in step S102 that the first period T1 has elapsed, then the count n is initialized to 0 in step S103. Thereafter, in step S104, the control circuit 25 changes the potential at the control terminal GP from the low potential to a high potential. Since the second transistor 82 is turned on, the potential at the control input terminal 42 is applied to the gate of the transistor 22. The gate-to-source voltage of the transistor 22 now becomes 0, turning off the transistor 22.

In step S105, the control circuit 25 waits until the predetermined off-period Toff elapses. During the off-period Toff, the control terminal GP remains at the high potential. During the off-period Toff, therefore, the transistor 22 remains deenergized.

If it is judged in step S105 that the off-period Toff has elapsed, then the control circuit 25 changes the potential at the control terminal GP from the high potential to the low potential again in step S106. Thereafter, control proceeds to step S107, in which the control circuit 25 waits until the predetermined on-period Ton, e.g., 60 µs, elapses. During the on-period Ton, the control terminal GP remains at the low potential.

During the on-period Ton, therefore, the transistor 22 is energized, thereby again energizing the drive coil 20.

If it is judged in step S107 that the on-period Ton has elapsed, then the count n is incremented by +1 in step S108. Thereafter, the control circuit 25 determines whether the count n is the predetermined count N, e.g., 256, or not in step S109. If it is judged in step S109 that the count n is not equal to the predetermined count N, control returns to step S104 and processing from step S104 is repeated. By repeating the processing from step S104, 256 intermittent pulses are generated in the second period T2.

If it is judged in step S109 that the count n is equal to the predetermined count N, then the control circuit 25 changes the potential at the control terminal GP from the low potential to the high potential again in step S110. The second transistor 82 is turned on, and the transistor 22 is turned off. Thereafter, in step S111, the control circuit 25 waits until the predetermined off-period Toff elapses. During the off-period Toff, the control terminal GP remains at the high potential. When the off-period Toff elapses, the second period T2 is terminated.

If it is judged in step S111 that the off-period Toff has elapsed, then the control circuit 25 determines in step S112 whether the control input terminal 42 is at the high potential or not, i.e., whether the operation command period Td has terminated or not. If it is judged in step S112 that the operation command period Td has not terminated, control proceeds to step S113, in which the control circuit 25 changes the potential at the control terminal GP from the high potential to the low potential again, thereby turning off the second transistor 82, and turning the transistor 22 on. Thereafter, processing from step S102 is repeated. By repeating the processing from step S102, the cycle Ts including the first period T1 and the second period T2 is repeated until the operation command period Td is terminated. If it is judged in step S112 that the operation command period Td has terminated, then the processing sequence of the control circuit 25 of the operation controlling apparatus 40B is put to an end.

With the operation controlling apparatus 40B, as described above, even when the solenoid-operated valve 10 is subjected to an external shock during the operation command period Td, the movable element 64 remains held in position inside the drive coil 20. Even if the solenoid-operated valve 10 is subjected to a shock during the second period T2, the drive coil 20 is energized in the rated-voltage mode before the fluid pressure device starts changing the fluid passages, so that the fluid pressure device is prevented from operating unexpectedly.

Particularly, in the operation controlling apparatus 40B, at the same time that the operation command period Td begins, the transistor 22 is turned on, thus energizing the drive coil 20. Since the solenoid-operated valve 10 starts operating immediately when the operation command period Td begins, the response sensitivity of the solenoid-operated valve 10 is increased.

Although certain preferred embodiments of the present invention have been shown and described in detail, it should be understood that various changes and modifications may be made therein without departing from the scope of the invention as set forth in the appended claims.

What is claimed is:

1. An apparatus for controlling operation of a solenoid-operated valve, which is combined with the solenoid-operated valve for energizing a drive coil of the solenoid-operated valve in a rated-voltage mode at a rated-voltage and at a duty ratio of 100% during a predetermined first period, which is sufficiently long to move a movable element in said drive coil, from the time when an operation command signal starts being applied to the solenoid-operated valve, and for repeatedly energizing said drive coil in a power-saving mode at a duty ratio smaller than the duty ratio in said rated-voltage mode during a predetermined second period following said rated-voltage mode, wherein said drive coil is continuously energized alternately in multiple applications of said rated-voltage mode and said power-saving mode without gaps or interruption between said power-saving mode and said rated-voltage mode until application of said operation command signal to the solenoid-operated valve is terminated.

2. An apparatus according to claim 1, wherein the sum of said first period and said second period is shorter than a period required for a fluid pressure device connected to said solenoid-operated valve to start changing fluid passages in response to switching movement of said movable element of said solenoid-operated valve.

3. An apparatus according to claim 1, comprising:
a switching device; and
a control circuit, wherein:
said switching device is turned on when said operation command signal starts being applied to the solenoid-operated valve;
said control circuit controls an on-period of said switching device based on said rated-voltage mode in said first period and said power-saving mode in said second period, during a period from the time when said operation command signal starts being applied to the solenoid-operated valve until the time when said operation command signal ends being applied to the solenoid-operated valve; and said drive coil is energized during said on-period of said switching device.

4. An apparatus according to claim 1, comprising:

a switching device; and a control circuit, wherein:

said switching device is turned on when said operation command signal starts being applied to the solenoid-operated valve;

said control circuit controls an off-period of said switching device based on said rated-voltage mode in said first period and said power-saving mode in said second period, during a period from the time when said operation command signal starts being applied to the solenoid-operated valve until the time when said operation command signal ends being applied to the solenoid-operated valve; and said drive coil is energized during an on-period of said switching device.

5. An apparatus for controlling a drive coil of a solenoid-operated valve, comprising:

a switching device for selectively energizing said drive coil during an operation period; and a control circuit for controlling said switching device; said control circuit comprising:

rated-voltage mode energizing means for controlling said switching device to energize said drive coil in a rated-voltage mode at a rated-voltage and at a duty ratio of 100% during a predetermined first period;

power-saving-mode energizing means for controlling said switching device to repeatedly energize said drive coil at a duty ratio smaller than the duty ratio in said rated-voltage mode during a predetermined second period following elapse of said predetermined first period; and repeating means for controlling said rated-voltage mode energizing means and said power-saving-mode energizing means to continuously energize said drive coil alternately in multiple applications of said rated-voltage mode and said power-saving mode during said operation period without gaps or interruption between said power-saving mode and said rated-voltage mode.

6. An apparatus according to claim 5, wherein said first period is sufficiently long to move a movable element in said drive coil.

7. An apparatus according to claim 5, wherein:

said switching device is turned on when said operation period begins;

said control circuit controls an on-period of said switching device based on said rated-voltage mode in said first period and based on said power-saving mode in said second period during said operation period; and said drive coil is energized during said on-period of said switching device.

8. An apparatus according to claim 5, wherein:

said switching device is turned on when said operation period begins;

said control circuit controls an off-period of said switching device based on said rated-voltage mode in said first period and based on said power-saving mode in said second period during said operation period; and said drive coil is energized during an on-period of said switching device.

9. A method of controlling the operation of a solenoid-operated valve by controlling a switching device for selectively energizing a drive coil of the solenoid-operated valve during an operation period, comprising the steps of:

controlling said switching device to energize said drive coil in a rated-voltage mode, at a rated-voltage and at a duty ratio of 100% during a predetermined first period;

controlling said switching device to repeatedly energize said drive coil at a duty ratio smaller than the duty ratio in said rated-voltage mode, during a predetermined second period following elapse of said first period; and controlling said switching device to continuously energize said drive coil alternately in multiple applications of said rated-voltage mode and said power-saving mode without gaps or interruption between said power-saving mode and said rated-voltage mode during said operation period.

* * * * *